US011934304B2

(12) United States Patent
Uhrenholt (10) Patent No.: US 11,934,304 B2
(45) Date of Patent: Mar. 19, 2024

(54) CIRCUITRY AND METHOD (71) Applicant: Arm Limited, Cambridge (GB)

(72) Inventor: Olof Henrik Uhrenholt, Lund (SE)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/937,112

(22) Filed: Sep. 30, 2022

(65) Prior Publication Data

US 2023/0105277 A1 Apr. 6, 2023

(30) Foreign Application Priority Data

Oct. 6, 2021 (GB) ..................................... 2114314

(51) Int. Cl.
*G06F 12/00* (2006.01)
*G06F 9/50* (2006.01)
*G06F 12/02* (2006.01)
*G06F 12/1009* (2016.01)

(52) U.S. Cl.
CPC ........ *G06F 12/0238* (2013.01); *G06F 9/5016* (2013.01); *G06F 12/1009* (2013.01); *G06F 2212/7201* (2013.01)

(58) Field of Classification Search
CPC ............... G06F 12/0238; G06F 9/5016; G06F 12/1009; G06F 2212/7201; G06F 12/145; G06F 12/1045; G06F 12/0292; G06F 9/30; G06F 12/02; G06F 12/14
See application file for complete search history.

(56) References Cited

U.S. PATENT DOCUMENTS

| 7,680,987 B1 * | 3/2010 | Clark ...................... G06F 12/08 |
| | | 711/155 |
| 9,158,681 B1 | 10/2015 | Samuels et al. |
| 10,474,359 B1 * | 11/2019 | Volpe .................... G06F 3/0644 |
| | | (Continued) |

FOREIGN PATENT DOCUMENTS

| CN | 112465690 A * | 3/2021 | ......... G06F 12/0802 |
| EP | 0288760 A2 | 11/1988 | |
| JP | 7106775 B2 * | 7/2022 | ......... G06F 12/0802 |

*Primary Examiner* — Shawn X Gu
*Assistant Examiner* — Mohammad S Hasan
(74) *Attorney, Agent, or Firm* — NIXON & VANDERHYE P.C.

(57) ABSTRACT

Circuitry comprises memory access circuitry to control memory access by mapping virtual memory addresses in a virtual memory address space to physical memory addresses in a physical memory address space, the memory access circuitry being configured to provide a sparse mapping in which a mapped subset of the virtual memory address space is mapped to physical memory while an unmapped subset of the virtual memory address space is unmapped, the memory access circuitry being configured to discard write operations to virtual memory addresses in the unmapped subset of the virtual memory address space and processing circuitry to execute program code defining a processing operation to generate processed data and to store the processed data in a memory region of the virtual memory address space applicable to that processing operation; detector circuitry to detect whether the memory region is entirely within the unmapped subset of the virtual memory address space.

18 Claims, 9 Drawing Sheets

(56) References Cited

U.S. PATENT DOCUMENTS

| | | | |
|---|---|---|---|
| 2004/0015864 A1* | 1/2004 | Boucher | G06F 11/3668 |
| | | | 717/124 |
| 2005/0198464 A1* | 9/2005 | Sokolov | G06F 12/145 |
| | | | 711/170 |
| 2006/0206687 A1* | 9/2006 | Vega | G06F 12/1036 |
| | | | 711/6 |
| 2008/0189528 A1* | 8/2008 | Robinson | G06F 11/263 |
| | | | 712/226 |
| 2010/0250853 A1* | 9/2010 | Krieger | G06F 12/1027 |
| | | | 711/E12.059 |
| 2011/0107052 A1* | 5/2011 | Narayanasamy | G06F 3/0608 |
| | | | 711/170 |
| 2012/0166137 A1* | 6/2012 | Grasser | G01C 15/06 |
| | | | 702/150 |
| 2012/0236010 A1* | 9/2012 | Ginzburg | G06F 12/08 |
| | | | 345/502 |
| 2013/0297722 A1* | 11/2013 | Wright | G06F 11/1469 |
| | | | 709/217 |
| 2016/0335134 A1* | 11/2016 | Gupta | G06F 9/5033 |
| 2018/0337204 A1* | 11/2018 | Bakowski Holtryd | |
| | | | H01L 27/1463 |
| 2019/0121743 A1* | 4/2019 | Park | G06F 12/0246 |
| 2020/0233612 A1* | 7/2020 | Dalmatov | G06F 3/0631 |
| 2021/0133109 A1* | 5/2021 | Bono | G06F 9/5016 |
| 2023/0105277 A1* | 4/2023 | Uhrenholt | G06F 9/5016 |
| | | | 711/154 |

* cited by examiner

| VA | PA | Mapped? |
|---|---|---|
| VA # 1 | | N |
| VA # 2 | PA #2 | Y |
| VA # 3 | | N |

Fig. 8

| VA | PA |
|---|---|
| VA # 2 | PA #2 |
| | |
| | |

| VA | Mapped? |
|---|---|
| VA # 1 | N |
| VA # 2 | Y |
| VA # 3 | N |

CIRCUITRY AND METHOD

CROSS-REFERENCE TO RELATED APPLICATIONS

This application claims priority pursuant to 35 U.S.C. 119(a) to United Kingdom Application No. 2114314.4, filed Oct. 6, 2021, which application is incorporated herein by reference in its entirety.

BACKGROUND

This disclosure relates to circuitry and methods.

Graphics processing units (GPUs) are used to perform rendering and other processing operations which may be related to the generation of image data. It is also known to use GPUs for other processing operations, and indeed to use other types of processors to perform graphics or non-graphics processing.

The present disclosure concerns potential improvements in such arrangements.

SUMMARY

In an example arrangement there is provided circuitry comprising:
  memory access circuitry to control memory access by mapping virtual memory addresses in a virtual memory address space to physical memory addresses in a physical memory address space, the memory access circuitry being configured to provide a sparse mapping in which a mapped subset of the virtual memory address space is mapped to physical memory while an unmapped subset of the virtual memory address space is unmapped, the memory access circuitry being configured to discard write operations to virtual memory addresses in the unmapped subset of the virtual memory address space;
  processing circuitry to execute program code defining a processing operation to generate processed data and to store the processed data in a memory region of the virtual memory address space applicable to that processing operation;
  detector circuitry to detect whether the memory region is entirely within the unmapped subset of the virtual memory address space; and
  control circuitry to inhibit completion of the processing operation in response to a detection by the detector circuitry that the memory region applicable to that processing operation is entirely within the unmapped subset of the virtual memory address space.

In another example arrangement there is provided a method comprising:
  controlling memory access by mapping virtual memory addresses in a virtual memory address space to physical memory addresses in a physical memory address space, the controlling step providing a sparse mapping in which a mapped subset of the virtual memory address space is mapped to physical memory while an unmapped subset of the virtual memory space is unmapped, the controlling step comprising discarding write operations to virtual memory addresses in the unmapped subset of the virtual memory address space;
  executing program code defining a processing operation to generate processed data and to store the processed data in a memory region of the virtual memory address space applicable to that processing operation;
  detecting whether the memory region is entirely within the unmapped subset of the virtual memory address space; and
  inhibiting completion of the processing operation in response to a detection by the detector circuitry that the memory region applicable to that processing operation is entirely within the unmapped subset of the virtual memory address space.

In another example arrangement there is provided a method comprising:
  compiling source code defining a processing operation which generates processed data and stores the processed data in a memory region of the virtual memory address space applicable to that processing operation to generate respective object code;
  detecting whether the source code defines one or more further operations to generate output data other than the processed data stored to the memory region of the virtual memory address space; and
  associating flag data with the object code to indicate the result of the detecting step.

Further respective aspects and features of the present technology are defined by the appended claims.

BRIEF DESCRIPTION OF THE DRAWINGS

The present technique will be described further, by way of example only, with reference to embodiments thereof as illustrated in the accompanying drawings, in which.

DESCRIPTION OF EMBODIMENTS

Circuitry Overview

Figure 1:
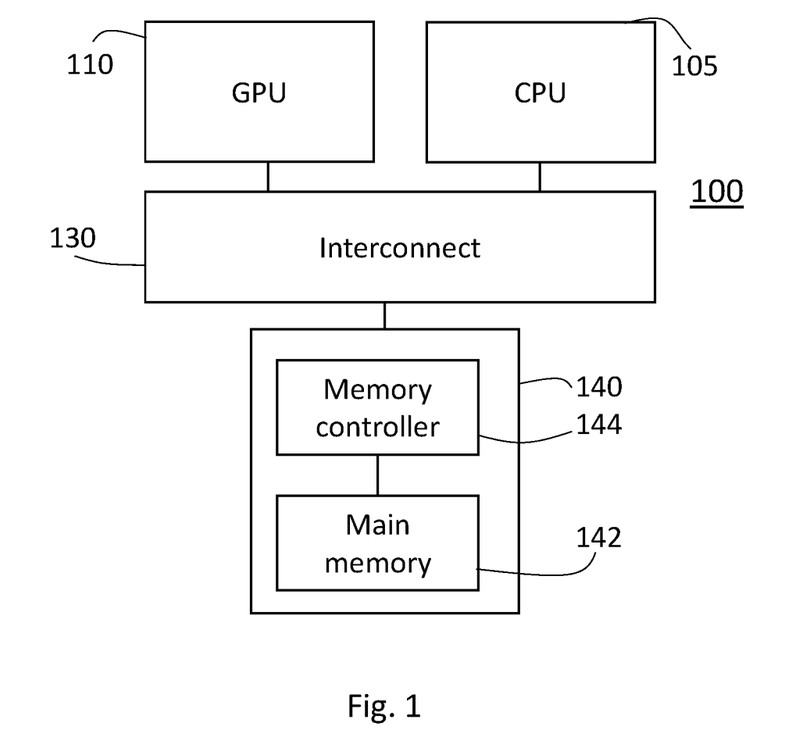
FIG. 1 schematically illustrates an example circuitry.

FIG. 1 schematically illustrates an example of data processing circuitry 100 comprising a central processing unit (CPU) 105, a graphics processing unit (GPU) 110, a power controller 120, interconnect circuitry 130 and a main memory 140.

In operation, each of the CPU 100 and the GPU 110 may perform respective processing tasks and more generally may be any device defined as a "processor" in the discussion above, and/or one or more other devices falling in this definition may be provided. For example, tasks performed by the CPU 105 may relate to control operations and tasks performed by the GPU 110 may relate to data handling operations such as image or video data rendering. However, this is just one example and other types of operations may be performed. Indeed, the use of a CPU 105 and GPU 110 is also just one schematic example and other types of and/or numbers of processors may be employed.

In the example shown, each of the CPU 100 and the GPU 110 may comprise, for example, respective execution engine circuitry having one or more cache memories. The various cache memories can form a hierarchy, so that if a respective execution engine circuitry requires access to a data item (which may represent a processing instruction and/or data to be handled by a processing instruction) it will try first to obtain or access that data item in a level 1 cache memory. In the case of a cache miss a search will be performed through the next closest cache memory levels, with an access to the memory circuitry 142 of the main memory being used only if the attempted cache memory accesses all miss. When the required data item is obtained from the memory circuitry 142 a copy may be saved in one or more of the cache memories.

The main memory 140 comprises memory circuitry 142, a memory controller 144 to control access to and from the memory circuitry 142 and may be associated with a cache memory such as a so-called level 3 cache memory.

In some examples, for a write, the system may fetch the line (as a "line fill") and then allocate that line in a cache. A write can then be performed into the line. Alternatively, a line can be allocated in the cache, and data written into the line. However, in this case (unless the entire line is written) there may be a need to keep information indicating which portions of the line were written (and which portions were not).

Although they are drawn as single respective entities the processors 100, 110 may in fact be embodied as multiple core processors or clusters. For example, there may be 8×CPU and/or 16×GPU.

Figure 2:
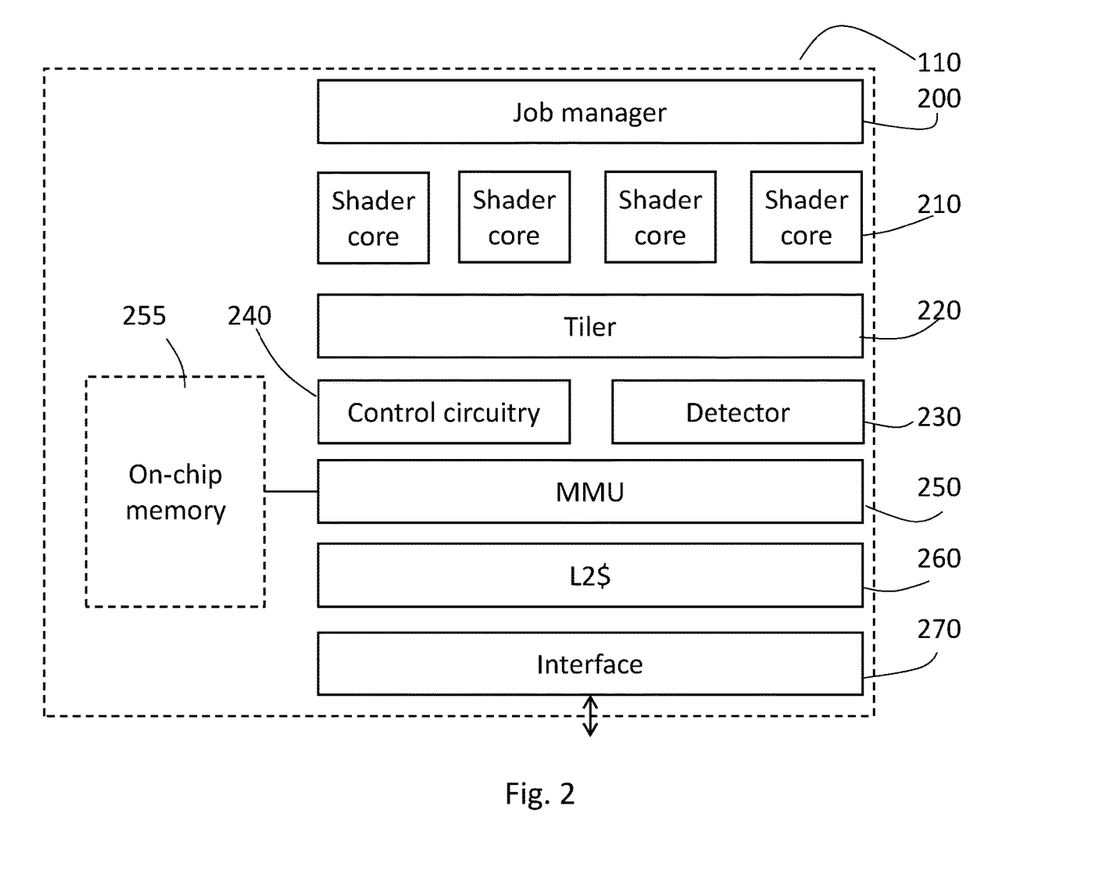
FIG. 2 schematically illustrates a graphics processing unit (GPU)

In the examples discussed below, features of the present techniques are applied to example rendering processing operations performed by the GPU. However, it will be appreciated that the techniques may also be applied to processing operations other than rendering operations and to operations performed by types of processors (such as the CPU 105) other than a GPU. In examples, however, the processing circuity comprises graphics processing circuitry configured to perform, as the processing operation, a graphics rendering operation such as a tile based deferred rendering operation. In examples, which each graphics rendering operation relates to a respective image tile of a graphics image to be rendered Example GPU Features FIG. 2 schematically illustrates an example structure of the GPU 110, comprising an interface 270 for retrieving data and instructions from the interconnect 130 and providing data such as processing results back to the interconnect 130, and a cache 260 (such as a level 2 cache memory or L2$) for storing data and/or instructions for input or processed data for output. A memory management unit (MMU) 250 can perform address translation and other functionality discussed below where this is required.

A job manager 200 controls the execution of processing tasks or jobs, for example being tasks or jobs established by the CPU 105, with the GPU-specific execution been performed by a set of shader cores 210 and tiler circuitry 220. In some examples, an on-chip memory 255 can be provided to store data being operated upon by the GPU. This provides an example of memory circuitry to provide storage according to the physical memory addresses in a physical memory address space, and an example in which the memory circuitry and the processing circuitry are fabricated as a common integrated circuit device.

The shader cores are processing units specifically optimized or designed for handling instructions, for example in the form of shader code in order to manipulate the pixels and polygon vertices within an image so as to render portions of that image.

The tiler circuitry handles portions of the GPU rendering operations, these portions corresponding to discrete regions or tiles of the rendered image. This process (of dividing the overall processing into tasks or regions) can reduce the instantaneous memory and data transfer requirements which occur during the rendering process by the GPU 110. The job manager 200 allocates jobs to the shader cores 210 and to the tiler circuitry 220.

In the drawing of FIG. 2, a group of four shader cores 210 is shown. In practice, a GPU may contain many shader cores, potentially more than four, but in at least some example GPUs the shader cores may be grouped into sets of four which may be arranged using the techniques described here so that each such set of four shader cores may share a level 2 cache 260. In other words, out of a potentially larger provision of level 2 cache storage, portions of it may be allocated to each such set of four shader cores using the techniques described here.

Detector circuitry 230 and control circuitry 240 are provided and perform respective functions to be described below.

Therefore, FIG. 2 provides an example of circuitry comprising:

memory access circuitry 250 to control memory access by mapping virtual memory addresses in a virtual memory address space to physical memory addresses in a physical memory address space, the memory access circuitry being configured to provide a sparse mapping in which a mapped subset of the virtual memory address space is mapped to physical memory while an unmapped subset of the virtual memory address space is unmapped, the memory access circuitry being configured to discard write operations to virtual memory addresses in the unmapped subset of the virtual memory address space;

processing circuitry 210, 220 to execute program code defining a processing operation to generate processed data and to store the processed data in a memory region of the virtual memory address space applicable to that processing operation;

detector circuitry 230 (as discussed below, to detect whether the memory region is entirely within the unmapped subset of the virtual memory address space); and control circuitry 240 (as discussed below, to inhibit completion of the processing operation in response to a detection by the detector circuitry that the memory region applicable to that processing operation is entirely within the unmapped subset of the virtual memory address space).

Note that the circuitry may provide two or more instances of processing circuitry 210, 220, each associated with control circuitry; and allocation circuitry 200 to allocate program code defining respective processing operations of a plurality of processing operations to the two or more instances of the processing circuitry.

Tile-Based Deferred Rendering (TBDR)

Examples of the present techniques are particularly applicable to TBDR techniques, in part because such TBDR techniques often perform fragment processing (to be discussed below) using on-chip storage. However, the present techniques are potentially applicable to other graphics or non-graphics techniques such as so-called immediate mode rendering (IMR).

In general terms, in a TBDR architecture, so-called graphics "primitives" are sorted such that fragment processing can be handled in independent tiles which are processed locally, for example using an on-chip frame buffer storage. The GPU job manager 200 allocates tiles to the (potentially plural) shader cores 210 for fragment processing.

Figure 3:
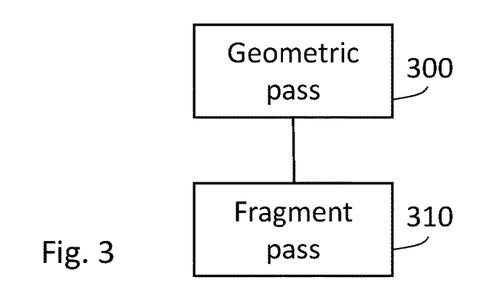
FIG. 3 is a schematic flowchart illustrating a method.

FIG. 3 is a schematic flowchart illustrating an example TBDR process as an example of an arrangement to which the present techniques may be applied. The example TBDR process comprises a geometric pass 300 followed by a fragment pass 310.

In the geometric pass 300, operations are performed relating to vertex shading, tessellation, geometry calculations and the generation of three-dimensional coordinates of post-transformation positions. The tiler calculates where each primitive may be visible. The frame buffer is treated as multiple tiles (for example, 32×32 pixel squares) and for each primitive, a detection is made as to which of these tiles it may potentially touch. The processing associated with a primitive is culled when the primitive is obviously not visible. The output of the geometric pass 300 is that the tiler produces a polygon list of all primitives which are at least potentially visible in the final rendered image.

At the fragment pass 310, for each 32×32 pixel tile, a walk is performed through the polygon list so that each primitive is considered in turn and any visible effect of the primitive relating to that tile is rasterized and shaded. In other words, rendering is deferred to the fragment pass 310.

In the fragment pass 310, one tile is processed at a time and jobs are allocated for processing on a tile-by-tile basis. Techniques to be described below allow for the potential culling or at least potentially early termination of tile processing jobs, so that processing can move on to a next job. This can potentially allow for a power saving (by not requiring the processing of jobs which can be culled or at least terminated early using these techniques) and/or a performance improvement by allowing more tiles to be processed within a given time period such as an output frame period in a video generation system.

Relating the steps of FIG. 3 to the circuitry of FIG. 2, the GPU 110 may have (for example) a single tiler 220 which is responsible for the vertex workload. This represents the first pass 300 in the two-pass approach of FIG. 3. Each shader core may have a respective "tile buffer unit" which manage the on-chip storage which is used for colour and ZS buffers (where Z represents a depth value and S represents a stencil value which may for example be used to limit an area of rendering or stenciling) during fragment shading of the second pass 310.

Sparse Resources

So-called sparse resources represent a feature available in various processors including at least some example GPUs to allow control of the memory backing of buffers. The use of sparse resources allows information such as graphical textures, which are themselves too large to fit into available memory resources such as the on-chip memory 255, to be handled. A virtual memory region is established as a plurality of smaller sections or control granules (typically of 64 kB but other sizes could be used). Some of these control granules are established to be memory-backed, which is to say they are mapped to corresponding sections of physical memory such as the on-chip memory 255, and some are not mapped to physical memory ("unmapped"). The mapping can be varied from time to time, for example under application program control as discussed below (unlike some other arrangements in which any changes to the mapping of virtual addresses to physical addresses always require a higher security level such as that applicable to an operating system or hypervisor). In an example use of this technique, a large texture can be established for use in many image scenes, with the memory backing being changed according to current requirements for a subset of the texture. This avoids the repeated allocation of a virtual memory address space and simply requires a change of the physical backing from time to time.

Sparse resources can be defined with respect to any of: input images, output caller buffers, textures and the like.

Figure 4:
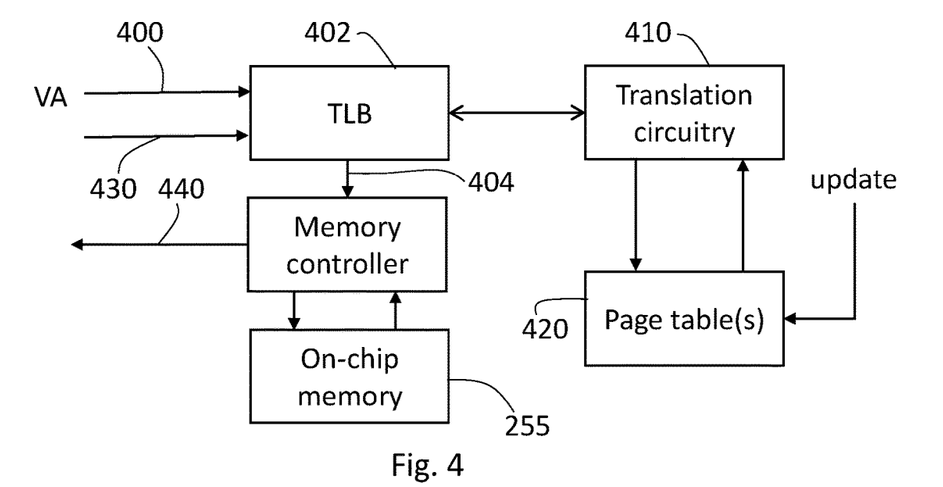
FIG. 4 schematically illustrates aspects of the operation of a memory management unit (MMU)

As background to the following discussion, FIG. 4 schematically illustrates a simplified operation of the MMU 250. This provides for the receipt of a virtual address 400 and, in the case of a memory write operation, data 430 to be written, and in the case of a memory read operation, the arrangement provides for the output of read data 440.

The virtual address (VA) 400 is provided to a buffer or cache of translation information referred to as a translation lookaside buffer (TLB) 402. If the required translation information is held by the TLB then it is output as a physical address (PA) 404, assuming that the current memory address is mapped to physical memory, or an indicator in place of the PA when the current memory address is unmapped, and which is provided to a memory controller 405. If the required translation information is not currently held by the TLB then the TLB consults translation circuitry 410 which in turn can reference one or more page tables 420 providing translation and optionally mapping information. At least the mapping information can be updated when required and when such an update takes place, any corresponding translation information held by the TLB 402 in invalidated. A driver together with the operating system manages the page tables. The driver may get input from the application to manage sparse resource mappings. The GPU is a consumer of page tables and from the GPU perspective they are read-only.

Assuming a valid PA is provided to the memory controller 405, the memory controller accesses the on-chip memory 255 using that PA and either rights the data 430 to it or read the contents at that PA, returning the read data to the memory controller 405 for output as the data 440. Significantly, and as discussed further below, a write operation to an unmapped sparse resource is quietly discarded (which is to say, it is discarded without generating a fault) and in the case of a read operation from an unmapped sparse resource, the memory controller 405 outputs zero as the read data 440 without generating a fault condition.

Therefore, FIG. 4 provides an example in which the memory access circuitry is configured to generate a mapping between a virtual memory address and a respective physical memory address by reference to one or more memory page tables. In examples, the one or more memory page tables may be configured to store indicator data indicating whether a given virtual memory address lies in the mapped subset of the virtual memory address space or the unmapped subset of the virtual memory address space.

Figure 5:
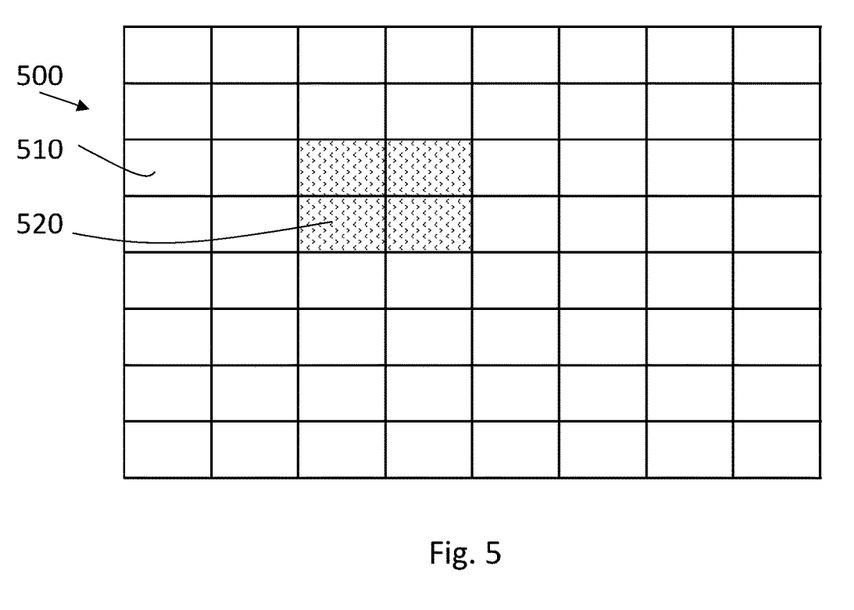
FIG. 5 schematically illustrates a sparse resource mapping.

FIG. 5 schematically illustrates a sparse resource mapping in which a sparse resource 500 comprising multiple control granules 510 is arranged so that only a subset 520 (drawn with shading) of the control granules are memory mapped, with other control granules being unmapped.

Figure 6:
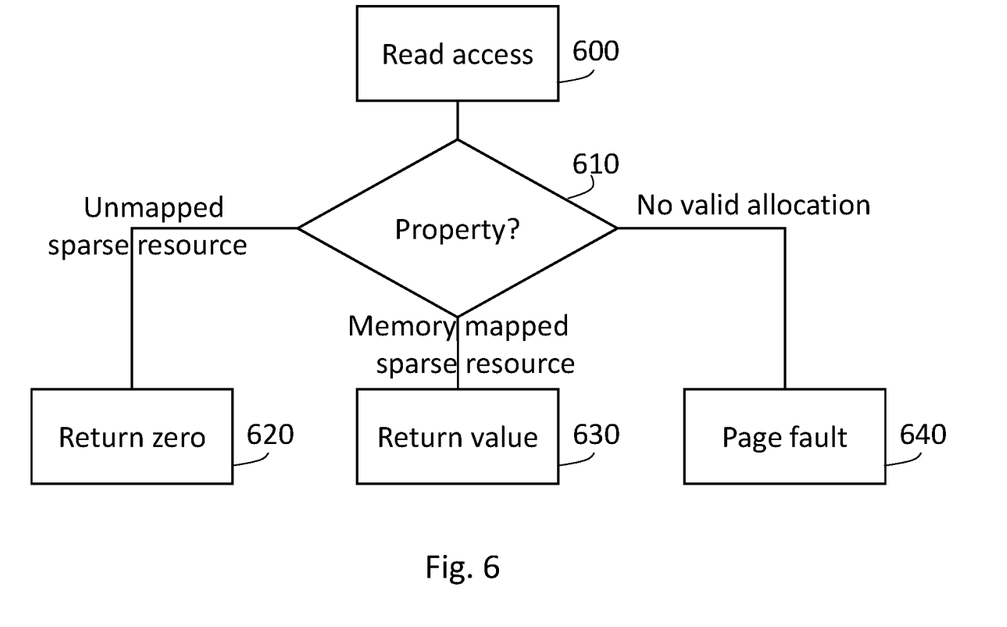
FIGS. 6 and 7 are schematic flowcharts illustrating respective methods.
Figure 7:
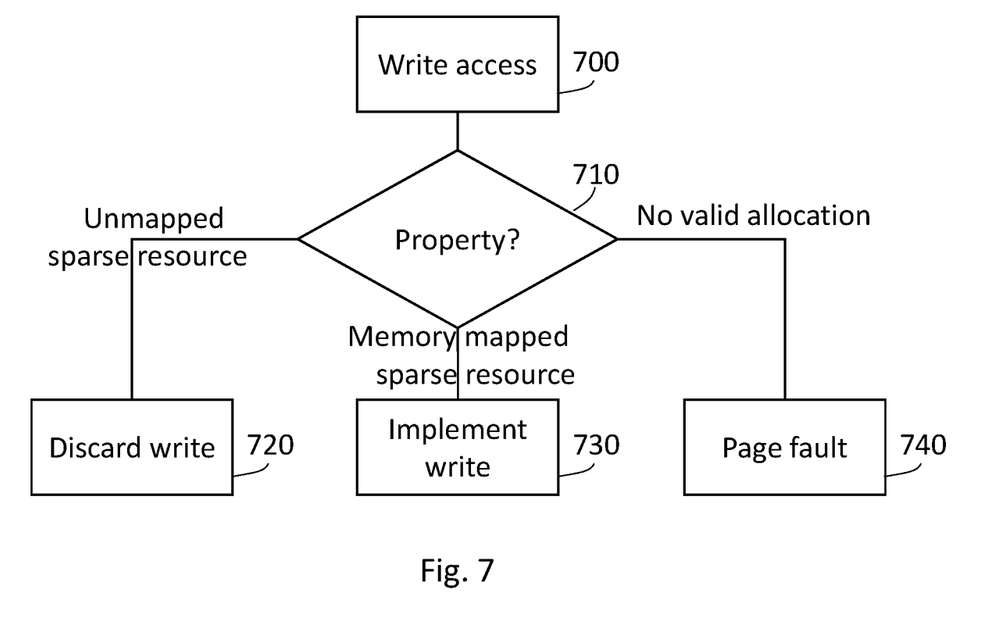

FIGS. 6 and 7 are schematic flowchart relating to read and write accesses respectively when sparse resources are in use.

Referring to FIG. 6, a read access is initiated for a given VA at step 600 and to step 610, the properties of that VA are established by the TLB 402. If the VA relates to an unmapped sparse resource, then zero is returned at step 620; if the VA relates to a memory mapped sparse resource then the stored value held by the mapped physical memory address is returned at step 630; and if there is no valid allocation then a page fault is returned at step 640.

FIG. 7 relates to the initiation of a write access for a given VA at step 700. Steps 710, 740 correspond to steps 610, 640 described above. In the case of an unmapped sparse resource, then the write operation is discarded at a step 720 and in the case of a memory mapped sparse resource then the write operation is implemented at step 730.

Figure 8:
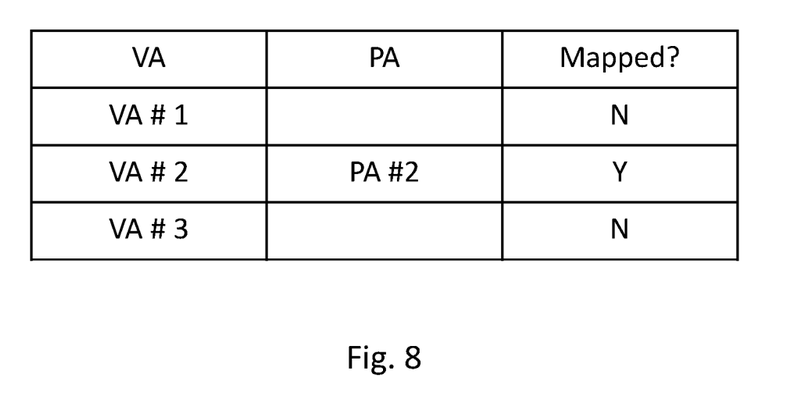
FIGS. 8 and 9 schematically illustrate respective examples of mapping tables.
Figure 9:
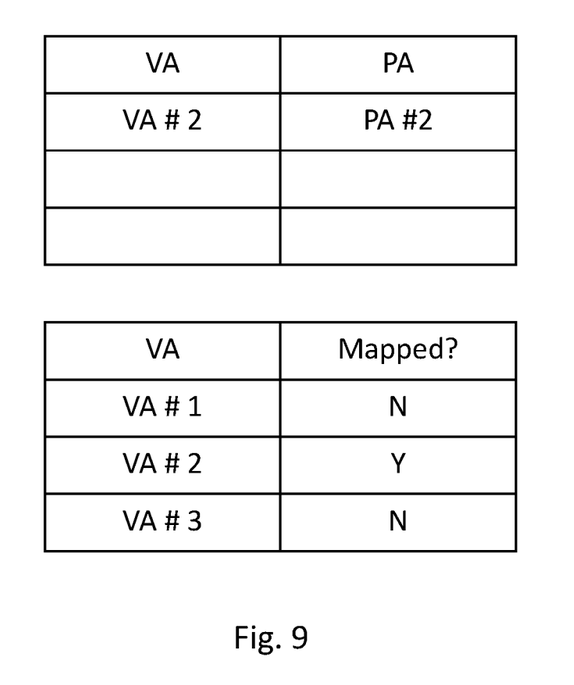

FIGS. 8 and 9 schematically illustrate different options for implementing the page table information 420 in a system using sparse resources. In FIG. 8, page table data (drawn as respective columns in the graphical representation as shown) provides, for each of a plurality of virtual addresses or virtual address ranges, an indication of whether that address is memory mapped in the sparse system and, where it is memory mapped, the corresponding physical address or physical address range. A similar arrangement is shown in FIG. 9, except that the mapping information is provided in a separate table or look-up to the translation information. Addressing of any of the tables of FIGS. 8 and 9 (in effect the left-most column is drawn) can be implied rather than explicit.

Side Effects

So-called "side-effects" will now be discussed as further background to the present techniques.

Figure 10:
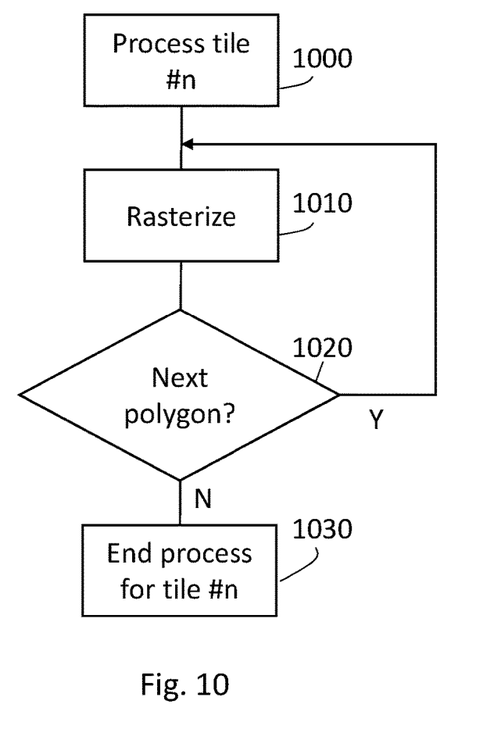
FIGS. 10 and 11 are schematic flowcharts illustrating respective methods.

FIG. 10 schematically represents the execution of a job to process a given tile during the fragment pass 310 in which processing of the tile is initiated at step 1000, and a process comprising the steps 1010, 1020 walks through each of the primitives in the polygon list to rasterize the current tile. When there are no further polygons in the primitive list, the processing for the given tile ends at step 1030.

Figure 11:
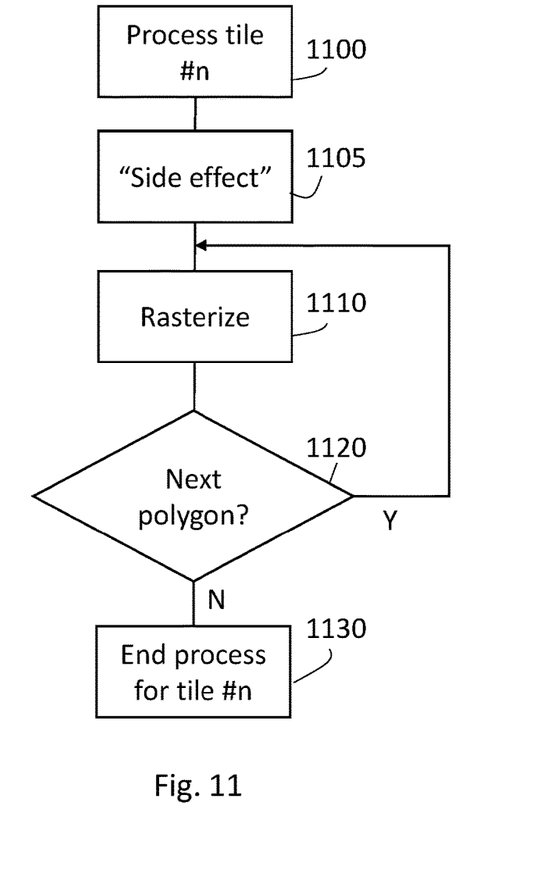

In FIG. 11, steps 1100, 1110, 1120, 1130 correspond to steps 1000, 1010, 1020, 1030 respectively, but a further step 1105 representing a so-called side effect is also shown. The side effect represents an operation outside of the memory region defined for the current tile. As an example, the side effect might comprise writing a counter value to a given memory address to provide a global count of the number of tiles processed.

In FIG. 11, the side effect step 1105 is shown as being ordered before the rasterization loop 1110, 1120. It will be appreciated that a genuine side effect could be implemented before or after the loop, but in examples of the present techniques, a compilation operation to generate the program code to perform the operations of FIG. 11 can be arranged so as to provide the side effect operation 1105 before the main loop 1110, 1120. This can potentially provide for greater efficiency improvements in situations such as those discussed below in which execution of the operations of FIG. 11 is terminated early, once the side effect has been executed.

Example Operations of the Detector and Control Circuitry

The present techniques recognize that where a job to be performed (for example) as part of the fragment pass 310 accesses entirely unmapped memory addresses in a sparse resource system, that job need not be performed, or at least need not be completed, with no adverse effect and potentially with a power or resource benefit by culling or early-terminating that job.

Figure 12:
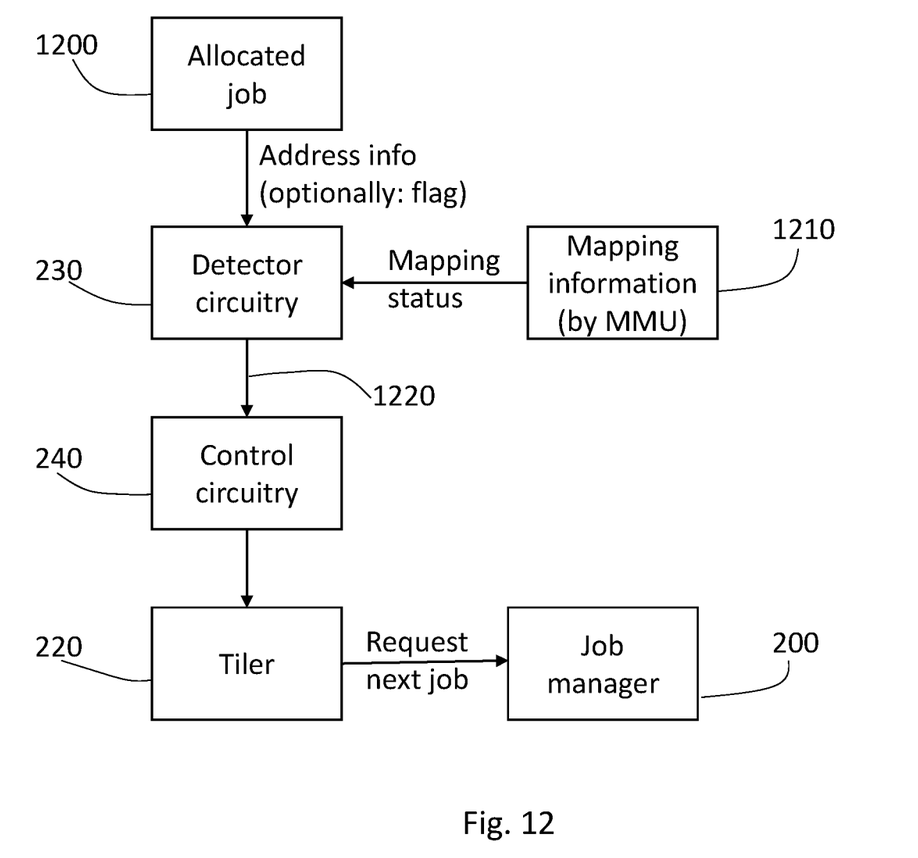
FIG. 12 schematically illustrates operations of detector and control circuitry.

FIG. 12 schematically illustrates an example operations of the detector circuitry 230 and the control circuitry 240, in connection with an allocated processing job 1200 provided or defined by the job manager 200.

The detector circuitry 230 is responsive to address information defining a range of addresses within a sparse resource to be accessed by that job and optionally to flag data (discussed further below) indicative of whether the job implements a side effect as discussed above. The detector circuitry 230 queries the MMU 250 to find the mapping status applicable to the address information using mapping information 1210, for example of the form described with reference to FIG. 8 or 9. Based on these operations, the detector circuitry generates control information 1220 indicating whether the allocated job is accessing entirely unmapped memory within the sparse resource and, optionally, whether the allocated job also provides a side effect.

Therefore, in these examples, the detector circuitry is configured to detect the indicator data stored by the one or more memory page tables in respect of virtual memory addresses defined by the memory region.

Based upon the information 1220, the control circuitry 240 controls the shader core 210 as follows:
- when the allocated job accesses (at least in part) a mapped granule, complete the allocated job;
- when the allocated job accesses entirely unmapped granules and, if a side effect check is implemented, has no side effect, cull or at least early-terminate the allocated job;
- when a side effect check is implemented, and the allocated job has a side effect but accesses entirely unmapped granules, early-terminate the allocated job after execution of the side effect.

In other examples, this information (provided by the indicator data) does not have to be stored in the page tables, even though this provides a convenient place to store it. Other options are possible. Another example of keeping the mapping information would be to have a shadow buffer for each texture with (for example) one bit of information per physical page of the primary buffer to indicate the current mapping status.

The shader core 210 requests a next job from the job manager 200 in response to culling or termination of a current job, whether that termination is early or at completion of the current job. This provides an example in which in response to the control circuitry inhibiting completion of a processing operation by a given instance of the processing circuitry, the allocation circuitry is configured to allocate program code defining a next processing operation to the given processing circuitry.

Figure 13:
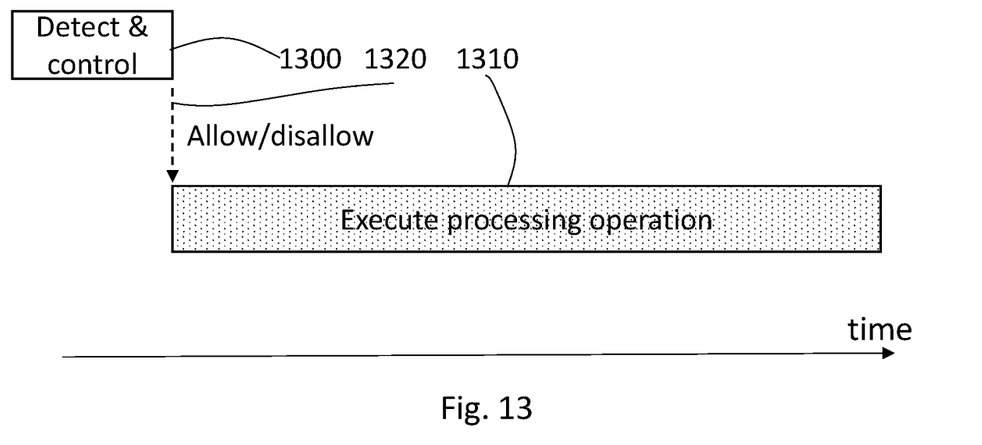
FIGS. 13 to 15 are schematic example timeline representations.
Figure 14:
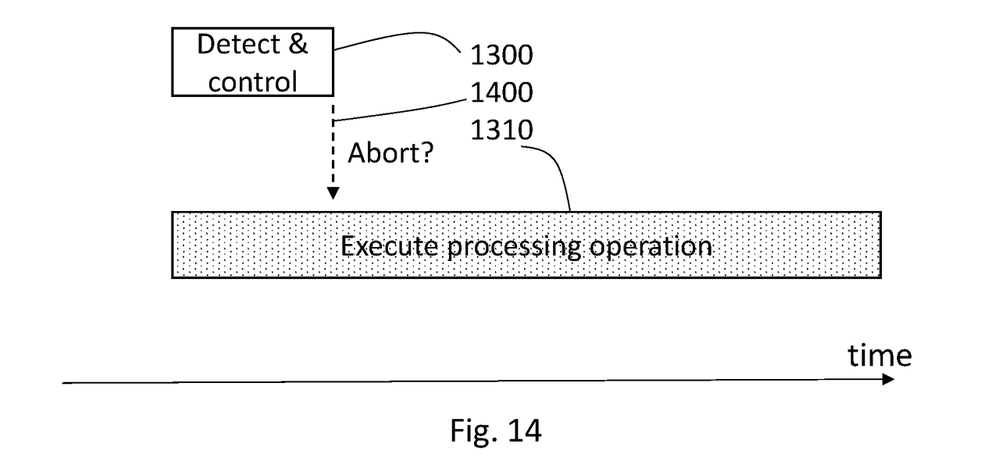
Figure 15:
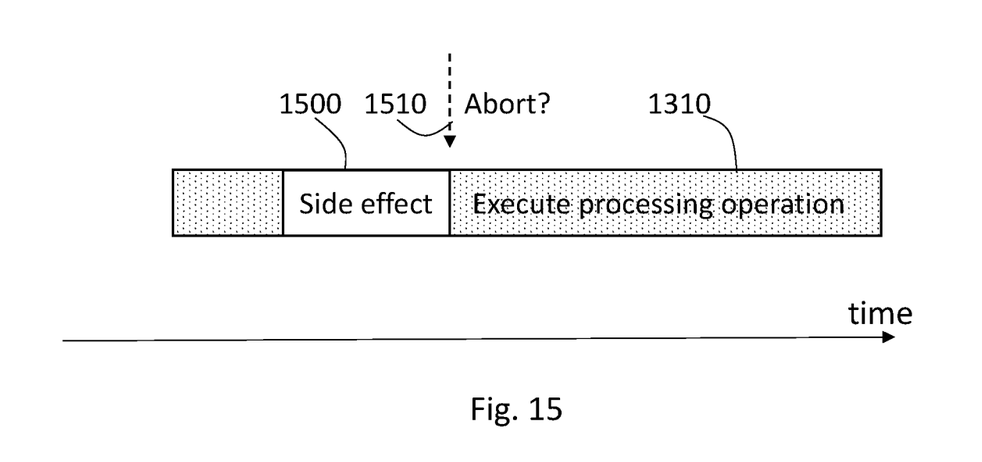

FIGS. 13 to 15 are schematic timeline representations illustrating timing aspects of the operations described above with reference FIG. 12.

Referring to FIG. 13, the operations 1300 of the detector circuitry 230 and the control circuitry 240 as described above are performed before execution 1310 of the processing operation or job is started, so as to enable the decision 1320 to allow/disallow (cull) the processing job to be made before execution 1310 starts. In this way, the job can be selectively culled entirely when it meets the conditions for culling set out above.

In FIG. 14, a slightly different arrangement is indicated in which the execution 1310 of the job is allowed to start while the operations 1300 of the detector circuitry 230 and the control circuitry 240 take place. This means that rather than a job being culled before it starts, the outcome of the operations of the detector circuitry and control circuitry may be a selective abort indication 1400 to cause the early termination of the execution 1310. In FIG. 15, a side effect execution 1500 is flagged to be part of the job execution 1310, and in this case, and abort or early termination indication 1510 is either provided to terminate the job after the side effect 1500 has been executed, or at least (if provided earlier) is not implemented until the side effect 1500 has been executed.

Figure 16:
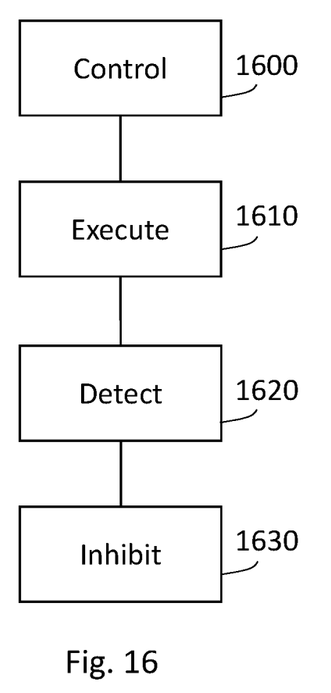
FIGS. 16 to 18 are schematic flowcharts illustrating respective methods.

By way of summary of the techniques described above, FIG. 16 is a schematic flowchart illustrating a method comprising:

controlling (at a step 1600) memory access by mapping virtual memory addresses in a virtual memory address space to physical memory addresses in a physical memory address space, the controlling step providing a sparse mapping in which a mapped subset of the virtual memory address space is mapped to physical memory while an unmapped subset of the virtual memory space is unmapped, the controlling step comprising discarding write operations to virtual memory addresses in the unmapped subset of the virtual memory address space;

executing (at a step 1610) program code defining a processing operation to generate processed data and to store the processed data in a memory region of the virtual memory address space applicable to that processing operation;

detecting (at a step 1620) whether the memory region is entirely within the unmapped subset of the virtual memory address space; and inhibiting (at a step 1630) completion of the processing operation in response to a detection by the detector circuitry that the memory region applicable to that processing operation is entirely within the unmapped subset of the virtual memory address space.

It will therefore be apparent that in at least some examples, the control circuitry 240 is configured to inhibit execution of the processing operation in response to a detection by the detector circuitry that the memory region applicable to that processing operation is entirely within the unmapped subset of the virtual memory address space. In other examples, early termination of an already started operation can be provided. It will be noted that either outcome is a potential optimization or improvement; if the detection and control operations do not inhibit or terminate operation even in a situation in which potentially they could do so, the situation is no worse than it would have been without the present techniques.

In the case that a side effect is detected, the detector circuitry may, as discussed above, be configured to detect whether the program code defines one or more further operations to generate output data other than the processed data stored to the memory region of the virtual memory address space; and the control circuitry may be configured to allow completion of the one or more further operations while inhibiting completion of the processing operation, in response to a detection by the detector circuitry that the program code defines one or more such further operations.

Compilation Examples

Figure 17:
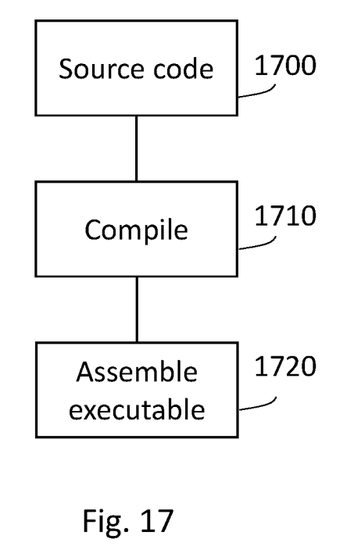

FIG. 17 schematically illustrates an overview of a compilation process in which source code 1700 is compiled at a step 1710 and executable code is assembled at a step 1720. In the present example, the compilation process of the step 1710 can be varied so as to generate flag data indicative of a side effect (which flag data can then be associated with the executable code at the step 1720) as shown schematically in the flowchart of FIG. 18.

Figure 18:
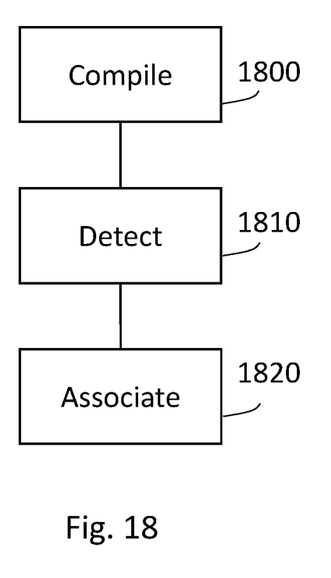

Accordingly, FIG. 18 is a schematic flowchart illustrating a method comprising:

compiling (at a step 1800) source code defining a processing operation which generates processed data and stores the processed data in a memory region of the virtual memory address space applicable to that processing operation to generate respective object code;

detecting (at a step 1810) whether the source code defines one or more further operations to generate output data other than the processed data stored to the memory region of the virtual memory address space; and associating (at a step 1820) flag data with the object code to indicate the result of the detecting step.

Note that as part of the compilation process described here, the generated code itself can contain instructions which:

implement any side effect early, for example as early as possible, within the execution of that code portion, for example before a main processing loop or operation to implement the rendering or related operation provided by that code portion (in other words, the compiling step 1800 may comprise generating object code instructions to implement the one or more further operations before implementation of the processing operation); and/or constrain that code to ignore an abort indication from the control circuitry 240 until after execution of the side effect (in other words, the compiling step 1800 may comprise generating object code instructions to ignore an abort indication until after execution of the one or more further operations).

Figure 19A:
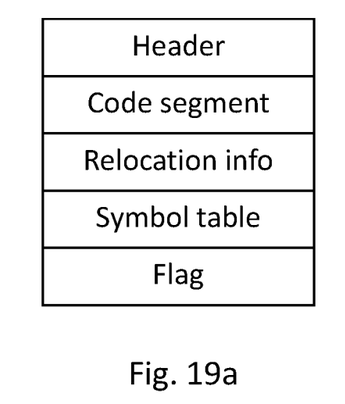
FIG. 19a schematically illustrates example executable code.

FIG. 19a provides a simplified schematic representation of the executable code generated at the step 1720, in which there are provided:

header information, for example defining properties of the remaining portions of the code;

a code segment providing object code generated by the compilation step 1710;

relocation information identifying any instructions and/or data which depend upon absolute addresses;

a symbol table resolving references to external labels;

flag data associated at the step 1720 indicative of whether the code segment provides a side effect. In the case that flag data is provided, the detector circuitry 230 may be configured to detect whether the program code defines one or more such further operations by detecting such flag data associated with the program code.

Figure 19B:
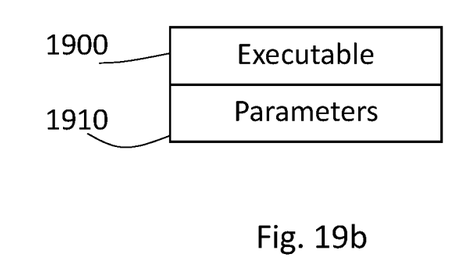
FIG. 19b schematically illustrates a processing job.

Referring to FIG. 19b, a job generated by the job manager 200 may relate to processing of an individual tile as discussed above and may define, contain or at least refer to the executable code 1900 of FIG. 19a and one or more parameters 1910 including parameters defining the address range of the tile to be processed (referred to as address information in FIG. 12).

General Matters

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the present techniques have been described in detail herein with reference to the accompanying drawings, it is to be understood that the present techniques are not limited to those precise embodiments, and that various changes, additions and modifications can be effected therein by one skilled in the art without departing from the scope and spirit of the techniques as defined by the appended claims. For example, various combinations of the features of the dependent claims could be made with the features of the independent claims without departing from the scope of the present techniques.

What is claimed is:

1. A circuitry comprising:
    memory access circuitry to control memory access by mapping virtual memory addresses in a virtual memory address space to physical memory addresses in a physical memory address space, the memory access circuitry being configured to provide a sparse mapping in which a mapped subset of the virtual memory address space is mapped to physical memory while an unmapped subset of the virtual memory address space is unmapped, the memory access circuitry being configured to discard write operations to virtual memory addresses in the unmapped subset of the virtual memory address space;
    processing circuitry to execute program code defining a processing operation to generate processed data and to store the processed data in a memory region of the virtual memory address space applicable to that processing operation;
    detector circuitry to detect whether the memory region is entirely within the unmapped subset of the virtual memory address space; and
    control circuitry to inhibit completion of the processing operation in response to a detection by the detector circuitry that the memory region applicable to that processing operation is entirely within the unmapped subset of the virtual memory address space.

2. The circuitry of claim 1, in which the control circuitry is configured to inhibit execution of the processing operation in response to a detection by the detector circuitry that the memory region applicable to that processing operation is entirely within the unmapped subset of the virtual memory address space.

3. The circuitry of claim 1, in which:
    the detector circuitry is configured to detect whether the program code defines one or more further operations to generate output data other than the processed data stored to the memory region of the virtual memory address space;
    in which the control circuitry is configured to allow completion of the one or more further operations while inhibiting completion of the processing operation, in response to a detection by the detector circuitry that the program code defines one or more such further operations.

4. The circuitry of claim 3, in which the detector circuitry is configured to detect whether the program code defines one or more such further operations by detecting flag data associated with the program code.

5. The circuitry of claim 1, in which the memory access circuitry is configured to generate a mapping between a virtual memory address and a respective physical memory address by reference to one or more memory page tables.

6. The circuitry of claim 5, in which the one or more memory page tables are configured to store indicator data indicating whether a given virtual memory address lies in the mapped subset of the virtual memory address space or the unmapped subset of the virtual memory address space.

7. The circuitry of claim 6, in which the detector circuitry is configured to detect the indicator data stored by the one or more memory page tables in respect of virtual memory addresses defined by the memory region.

8. The circuitry of claim 1, in which the processing circuitry comprises graphics processing circuitry configured to perform, as the processing operation, a graphics rendering operation.

9. The circuitry of claim 5, in which the graphics rendering operations are tile based deferred rendering operations.

10. The circuitry of claim 9, in which each graphics rendering operation relates to a respective image tile of a graphics image to be rendered.

11. The circuitry of claim 1, comprising:
    two or more instances of the processing circuitry each associated with control circuitry; and
    allocation circuitry to allocate program code defining respective processing operations of a plurality of processing operations to the two or more instances of the processing circuitry.

12. The circuitry of claim 11, in which, in response to the control circuitry inhibiting completion of a processing operation by a given instance of the processing circuitry, the allocation circuitry is configured to allocate program code defining a next processing operation to the given processing circuitry.

13. The circuitry of claim 1, comprising memory circuitry to provide storage according to the physical memory addresses in a physical memory address space.

14. The circuitry of claim 13, in which the memory circuitry and the processing circuitry are fabricated as a common integrated circuit device.

15. A method comprising:
    controlling memory access by mapping virtual memory addresses in a virtual memory address space to physical memory addresses in a physical memory address space, the controlling step providing a sparse mapping in which a mapped subset of the virtual memory address space is mapped to physical memory while an unmapped subset of the virtual memory space is unmapped, the controlling step comprising discarding write operations to virtual memory addresses in the unmapped subset of the virtual memory address space;
    executing program code defining a processing operation to generate processed data and to store the processed data in a memory region of the virtual memory address space applicable to that processing operation;
    detecting whether the memory region is entirely within the unmapped subset of the virtual memory address space; and
    inhibiting completion of the processing operation in response to a detection by the detector circuitry that the memory region applicable to that processing operation is entirely within the unmapped subset of the virtual memory address space.

16. A method comprising:
    compiling source code defining a processing operation which generates processed data and stores the processed data in a memory region of the virtual memory address space applicable to that processing operation to generate respective object code;

detecting whether the source code defines one or more further operations to generate output data other than the processed data stored to the memory region of the virtual memory address space; and associating flag data with the object code to indicate the result of the detecting step.

17. The method of claim 16, in which the compiling step comprises:

generating object code instructions to implement the one or more further operations before implementation of the processing operation.

18. The method of claim 16, in which the compiling step comprises:

generating object code instructions to ignore an abort indication until after execution of the one or more further operations.

\* \* \* \* \*